(12) United States Patent
Wolf

(10) Patent No.: US 9,694,858 B2
(45) Date of Patent: Jul. 4, 2017

(54) FRONT OF A MOTOR VEHICLE

(71) Applicant: Dr. Ing. h.c. F. Porsche Aktiengesellschaft, Stuttgart (DE)

(72) Inventor: Thomas Wolf, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/795,034

(22) Filed: Jul. 9, 2015

(65) Prior Publication Data

US 2016/0016617 A1    Jan. 21, 2016

(30) Foreign Application Priority Data

Jul. 21, 2014 (DE) .......................... 10 2014 110 198

(51) Int. Cl.
*B62D 37/02* (2006.01)
*B60K 11/04* (2006.01)
*B60K 11/08* (2006.01)

(52) U.S. Cl.
CPC .............. *B62D 37/02* (2013.01); *B60K 11/04* (2013.01); *B60K 11/085* (2013.01)

(58) Field of Classification Search
CPC .......... B62D 37/02; B60H 1/34; B60K 11/04; B60K 11/085
USPC ....................................................... 180/68.1
See application file for complete search history.

(56) References Cited

U.S. PATENT DOCUMENTS

| 657,367 A | * | 9/1900 | Starck | ..................... E06B 7/084 49/87.1 |
| 2,248,094 A | * | 7/1941 | Kysor | ....................... F01P 7/12 236/35.3 |
| 4,673,206 A | * | 6/1987 | Kretschmer | ......... B62D 35/005 296/180.1 |
| 4,723,594 A | * | 2/1988 | Koehr | .................... B60K 11/04 123/196 AB |
| 4,938,303 A | * | 7/1990 | Schaal | ................. B60H 1/3227 123/41.48 |
| 6,033,010 A | * | 3/2000 | Preiss | .................. B62D 35/005 296/180.1 |

(Continued)

FOREIGN PATENT DOCUMENTS

DE    10159783    6/2003
DE    102004010632    10/2005

(Continued)

OTHER PUBLICATIONS

German Search Report of Apr. 6, 2015.

*Primary Examiner* — J. Allen Shriver, II
*Assistant Examiner* — Brian Cassidy
(74) *Attorney, Agent, or Firm* — Gerald E. Hespos; Michael J. Porco; Matthew T. Hespos

(57) ABSTRACT

The invention relates to a front (1) of a motor vehicle (2) having an air inlet opening (5) and a first air duct (8) which emanates from the air inlet opening (5) and in which a heat exchanger (10) is arranged, through which air can flow, having a second air duct (9) which emanates from the air inlet opening (5) and is arranged adjacently with respect to the first air duct (8) and guides an air flow into the wheel arch (3) or to the side of the wheel arch (3), an air flow control apparatus (16, 19) being provided which controls the air flow through the first air duct (8) and/or through the second air duct (9).

12 Claims, 5 Drawing Sheets

(56) References Cited

U.S. PATENT DOCUMENTS

| | | | | |
|---|---|---|---|---|
| 6,302,228 B1* | 10/2001 | Cottereau | B60K 11/08 180/68.1 |
| 6,390,217 B1* | 5/2002 | O'Brien | B60K 11/04 160/DIG. 1 |
| 6,405,819 B1* | 6/2002 | Ohkura | B60K 11/08 180/68.1 |
| 6,626,483 B2* | 9/2003 | Ozawa | B62D 29/043 180/68.1 |
| 6,743,089 B2* | 6/2004 | Driller | B60H 1/345 454/124 |
| 6,854,544 B2* | 2/2005 | Vide | B60K 11/085 180/68.1 |
| 7,232,367 B2* | 6/2007 | Butera | B60H 1/00664 165/202 |
| 7,886,859 B2* | 2/2011 | Caldirola | B60K 11/08 123/41.59 |
| 8,091,668 B2* | 1/2012 | Amano | B60K 11/085 123/41.05 |
| 8,127,878 B2* | 3/2012 | Teraguchi | B60K 11/08 180/68.1 |
| 8,292,014 B2* | 10/2012 | Sugiyama | B60K 11/085 123/41.06 |
| 8,297,685 B2* | 10/2012 | Wolf | B62D 35/02 296/180.1 |
| 8,302,714 B2* | 11/2012 | Charnesky | B60K 11/085 180/68.1 |
| 8,382,564 B2* | 2/2013 | Miki | B60H 1/34 165/41 |
| 8,469,128 B2* | 6/2013 | Van Buren | B60K 11/085 165/44 |
| 8,473,164 B2* | 6/2013 | Charnesky | B60K 11/085 123/41.04 |
| 8,474,557 B2* | 7/2013 | Wolf | B60T 5/00 180/68.1 |
| 8,540,043 B2* | 9/2013 | Mehlos | F02M 35/161 180/68.1 |
| 8,561,738 B2* | 10/2013 | Charnesky | B60K 11/085 180/68.1 |
| 8,571,749 B2* | 10/2013 | Kawato | B60K 11/085 123/41.04 |
| 8,627,911 B2* | 1/2014 | Tregnago | B60K 11/085 180/68.1 |
| 8,631,889 B2* | 1/2014 | Begleiter | B60K 11/085 180/68.1 |
| 8,645,028 B2* | 2/2014 | Mochizuki | B60K 11/085 123/41.05 |
| 8,646,552 B2* | 2/2014 | Evans | B60K 11/085 180/68.1 |
| 8,689,917 B2* | 4/2014 | Miesterfeld | B60K 11/085 180/68.1 |
| 8,708,075 B2* | 4/2014 | Maurer | B60K 11/08 180/68.1 |
| 8,763,738 B2* | 7/2014 | Missig | B62D 35/02 180/68.1 |
| 8,794,363 B2* | 8/2014 | Wolf | B60K 11/085 180/68.1 |
| 8,919,300 B2* | 12/2014 | Klinkert | B60K 11/08 123/41.58 |
| 9,216,644 B2* | 12/2015 | Cardile | B60K 11/085 |
| 9,233,605 B2* | 1/2016 | Hijikata | B60K 11/085 |
| 2004/0002298 A1* | 1/2004 | Osada | B60H 1/3421 454/155 |
| 2005/0029027 A1* | 2/2005 | Kunikata | B60K 11/02 180/68.1 |
| 2008/0036289 A1* | 2/2008 | Thompson | B60B 35/08 301/125 |
| 2010/0243352 A1* | 9/2010 | Watanabe | B60K 11/085 180/68.1 |
| 2011/0308763 A1* | 12/2011 | Charnesky | B60H 1/3227 165/41 |
| 2012/0071075 A1* | 3/2012 | Wolf | B60T 5/00 454/162 |
| 2012/0090906 A1* | 4/2012 | Charnesky | B60K 11/085 180/68.1 |
| 2012/0270490 A1* | 10/2012 | Turner | F01P 7/12 454/75 |
| 2012/0323448 A1* | 12/2012 | Charnesky | B60K 11/085 701/49 |
| 2014/0196965 A1* | 7/2014 | Platto | B60K 11/085 180/68.1 |
| 2015/0232138 A1* | 8/2015 | Parry-Williams | B62D 35/02 296/180.5 |
| 2015/0343893 A1* | 12/2015 | Nam | B60K 11/085 701/49 |
| 2015/0345578 A1* | 12/2015 | Nightingale | B60K 11/085 188/264 AA |
| 2016/0176450 A1* | 6/2016 | Wolf | B62D 35/00 180/68.2 |

FOREIGN PATENT DOCUMENTS

| | | |
|---|---|---|
| EP | 0175655 | 6/1989 |
| FR | 2858796 | 2/2005 |
| JP | 2003035224 | 2/2003 |

\* cited by examiner

FRONT OF A MOTOR VEHICLE

CROSS REFERENCE TO RELATED APPLICATION

This application claims priority under 35 USC 119 to German Patent Appl. No. 10 2014 110 198.7 filed on Jul. 21, 2014, the entire disclosure of which is incorporated herein by reference.

BACKGROUND

1. Field of the Invention

The invention relates to a front of a motor vehicle.

2. Description of the Related Art

Motor vehicles have a vehicle body with front and rear ends. The vehicle body is subjected to air flow during movement of the motor vehicle. The air flow causes air resistance with respect to the vehicle body, and the air resistance is partially responsible for the fuel consumption of the motor vehicle. The wheels typically are arranged in wheel arches and rotate during driving of the motor vehicle. Air eddying to the side of the wheel arches also increases the air resistance and has an influence on the fuel consumption.

FR 2 858 796 A1 discloses a motor vehicle with an air inlet in the front bumper for guiding air into the wheel arch. As a result, eddying of air by the wheel in the wheel arch is intended to be reduced thereby reducing fuel consumption.

EP 0 175 655 B1 discloses a motor vehicle with an air inlet in the front bumper for guiding air proportionately to the brakes in the wheel arch and to a radiator for engine cooling. The air distribution to the wheel arch and to the radiator is determined by flow cross sections and flow resistances of the respective flow ducts, through which flow passes. The flow duct designed is adapted to a specific operating situation, and the air distribution is not of optimum configuration in other operating situations.

It is therefore the object of the invention to provide a front of a motor vehicle to improve air distribution for cooling and for reducing air resistance.

SUMMARY

One embodiment of the invention relates to a front of a motor vehicle having an air inlet opening. A first air duct emanates from the air inlet opening and has a heat exchanger through which air can flow. A second air duct also emanates from the air inlet opening and is adjacent to the first air duct. The second air duct guides an air flow into the wheel arch or to the side of the wheel arch. The motor vehicle also has an air flow control apparatus that controls the air flow through the first and/or second air ducts. As a result, the throughflow of the first and/or the second air duct can be adapted to the required air flows. In this way, the air can be guided through both the first and second air ducts in one operating state. In another operating state, the air can be guided only through the second air duct if the air flow through the heat exchanger is not required. This increases the air flow in the second air duct and further reduces eddying at the wheel arch.

The air flow control apparatus may be in the air inlet opening and controls the air flow through the first and second air ducts. In this way, the air flow that enters the air inlet opening can be divided by the air flow control apparatus arranged therein.

The air flow control apparatus may be at a transition from the air inlet opening to the first and/or second air duct and controls the air flow through the two air ducts.

The air flow control apparatus may arranged in the first and/or in the second air duct to control the air flow through the first air duct and/or through the second air duct.

The air flow control apparatus may be upstream of the heat exchanger in the air flow direction. In this way, all of the air that enters the air inlet opening can be guided into the other air duct if the respective air duct is closed off. If more cooling air is required, the second air duct can be closed off. If less cooling air is required, the first air duct can be throttled or closed off so that more air can flow through the second air duct.

An air flow control apparatus downstream of the heat exchanger in the air flow direction also can control the air flow through the heat exchanger. More air can flow through the second air duct if the air duct downstream of the heat exchanger is throttled or closed.

The air flow control apparatus may have flaps, slats or other control elements that can be displaced or rotated or otherwise moved to control the air flow. In this way, satisfactory controllability of the air throughflow can be achieved.

Control elements that can be controlled jointly or independently of one another may be in the first and/or in the second air duct or upstream of the first and/or second air duct. Independently controlled air flow control elements can be actuated individually to set the required air flow.

The first air duct may open into the wheel arch to improve the throughflow of the heat exchanger.

The second air duct may open into the wheel arch to reduce eddying of the air to the side of the wheel arch.

The second air duct may open on the side of the vehicle body in front of the wheel arch. This reinforces the reduction in eddying of the air on account of the wheel rotation because the lateral air flow shields the eddied air in an improved manner.

DETAILED DESCRIPTION

Figure 1:
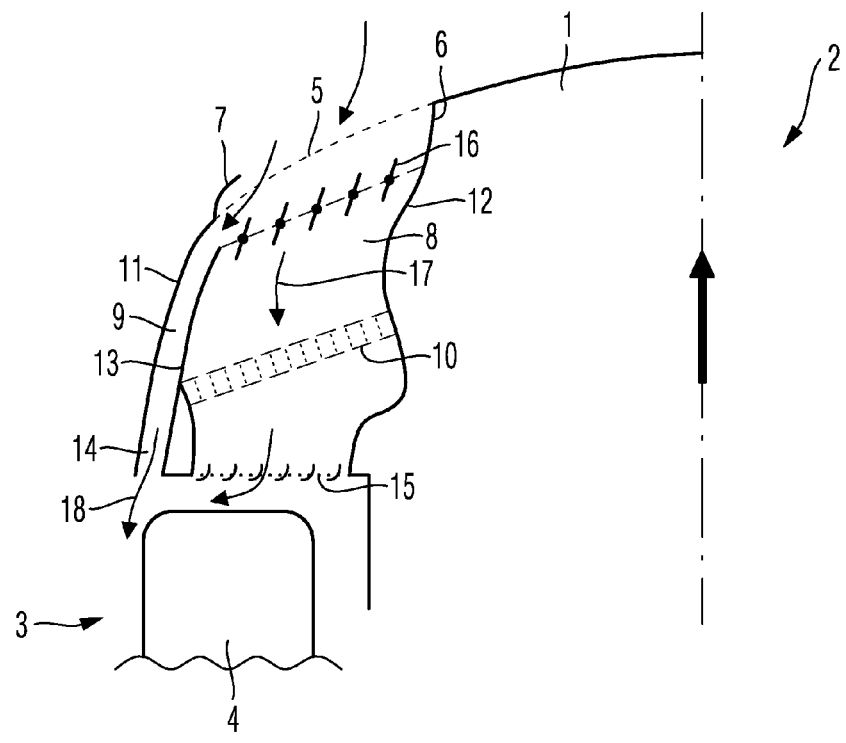
FIG. 1 is a partial and diagrammatic sectional illustration of a front of a motor vehicle according to first embodiment.
Figure 2:
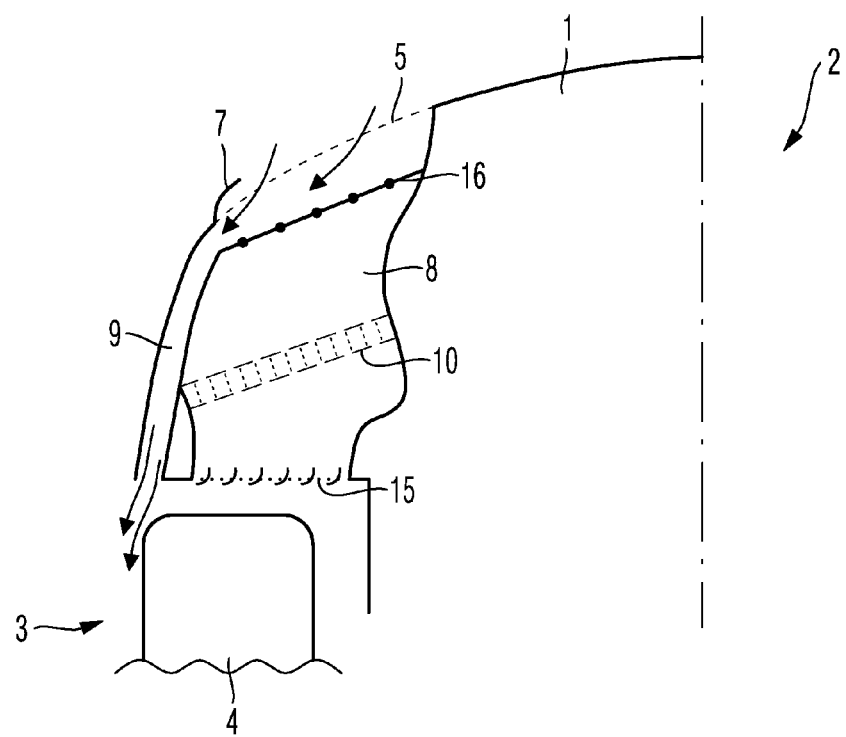
FIG. 2 is a partial and diagrammatic sectional illustration of the embodiment of FIG. 1 in a different operating state.

FIG. 1 shows a partial view of the left-hand part of a front 1 of a vehicle 2 having a wheel arch 3 and a wheel 4 arranged therein.

An air inlet opening 5 is provided in the front 1, such as in the bumper. The air inlet opening 5 is delimited by a circumferential wall 6 with a laterally arranged air guiding element 7. Two air ducts 8, 9 emanate from the air inlet opening 5. The air duct 8 has a heat exchanger 10 therein and air flows through the heat exchanger 10. The first air duct 8 has an air outlet opening 15 that opens into the wheel arch 3 downstream of the heat exchanger 10.

The second air duct 9 is adjacent the first air duct 8 and is on the outer side of the first air duct 8. Both the first and the second air duct 8, 9 emanate from the air inlet opening 5. The second air duct 9 opens with its air outlet opening 14 into the wheel arch 3 to the side of the vehicle wall 11. In the section that is shown, the first air duct 8 is delimited by two walls 12, 13, while the second air duct 9 is delimited by the wall 13 and the vehicle wall 11. The wall 13 therefore separates the first and second air ducts 8, 9.

An air flow control element 16 is provided at the inlet of the first air duct 8. The air flow control element 16 controls the air flow 17 through the first air duct 8 and therefore also influences the air flow 18 through the second air duct 9.

If the air flow control element is opened to a maximum extent, a maximum air quantity per unit time flows through the first air duct 8. The remaining air that flows into the air inlet opening 5 then flows through the second air duct, as shown in FIG. 1.

If the air flow control element 16 is closed, a maximum air quantity flows through the second air duct 9, and substantially no air flows through the first air duct, as shown by FIG. 1.

If the air flow control element 16 is opened only partially, a medium air flow is set in both air ducts 8, 9.

Figure 3:
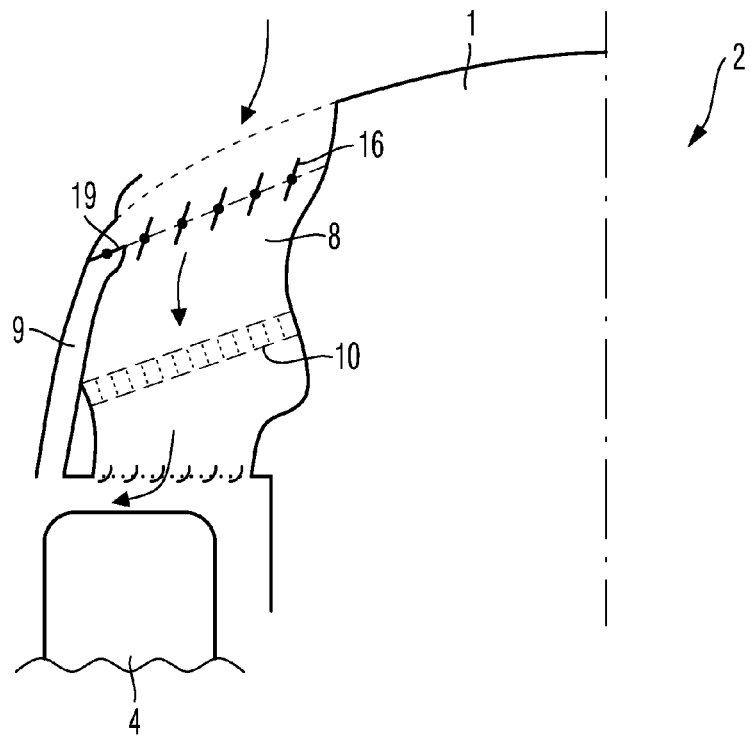
FIG. 3 is a partial and diagrammatic sectional illustration of a second embodiment of the front of a motor vehicle.
Figure 4:
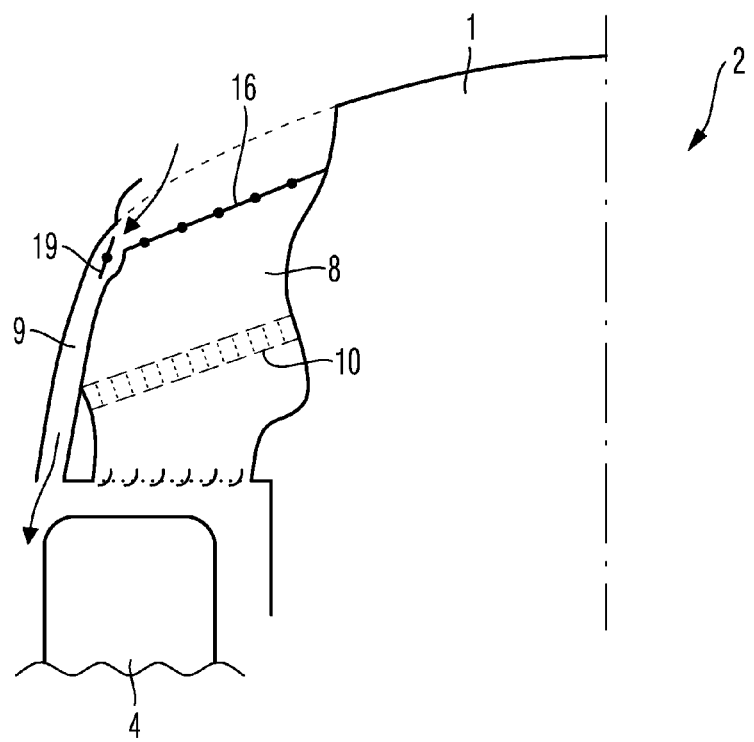
FIG. 4 is a partial and diagrammatic sectional illustration of the embodiment of FIG. 3 in a different operating state.

FIGS. 3 and 4 show a further exemplary embodiment, in which an air flow control element 19 is arranged at the inlet to the second air duct 9.

In FIG. 3, the air flow control element 19 is closed and the air flow control element 16 of the first air duct is open. As a result, the maximum air flow can flow through the first air duct 8.

In FIG. 4, the air flow control element 19 is open and the air flow control element 16 of the first air duct 8 is closed. As a result, the maximum air flow can flow through the second air duct 9.

Figure 5:
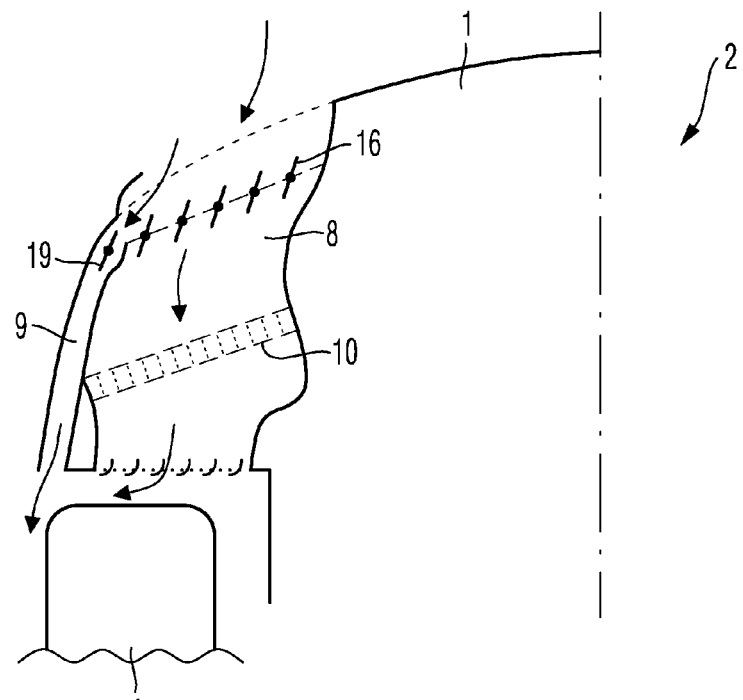
FIG. 5 is a partial and diagrammatic sectional illustration of the embodiment of FIG. 3 in a different operating state.

In FIG. 5, the air flow control element 19 of the second air duct 9 is open and the air flow control element 16 of the first air duct 8 also is open. As a result, an optimum air flow is set through the first and the second air ducts 8, 9.

Figure 6:
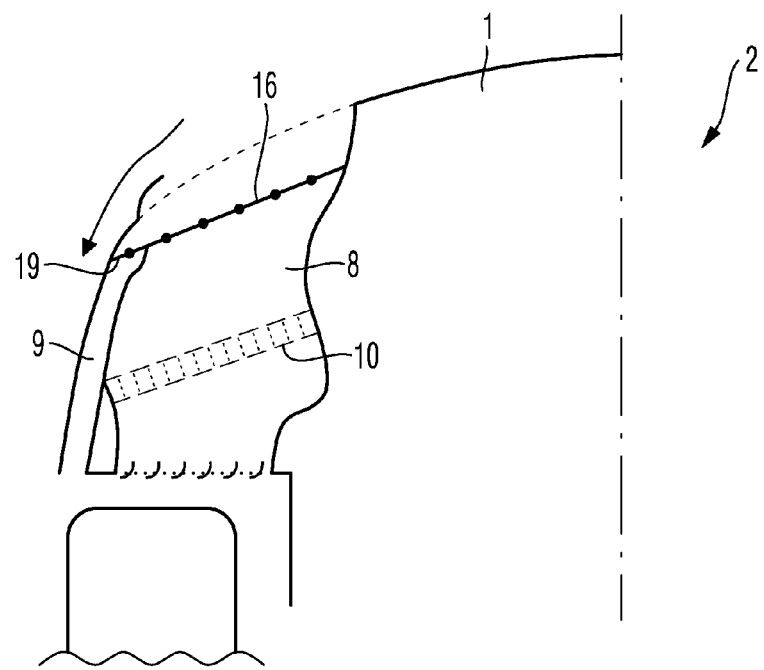
FIG. 6 is a partial and diagrammatic sectional illustration of the embodiment of FIG. 3 in a different operating state.

In FIG. 6, the air flow control element 19 of the second air duct 9 and the air flow control element 16 of the first air duct 8 are closed. As a result, no air flow is set through the first and second air ducts 8, 9. The air flows past the front 1 on the outside.

Figure 7:
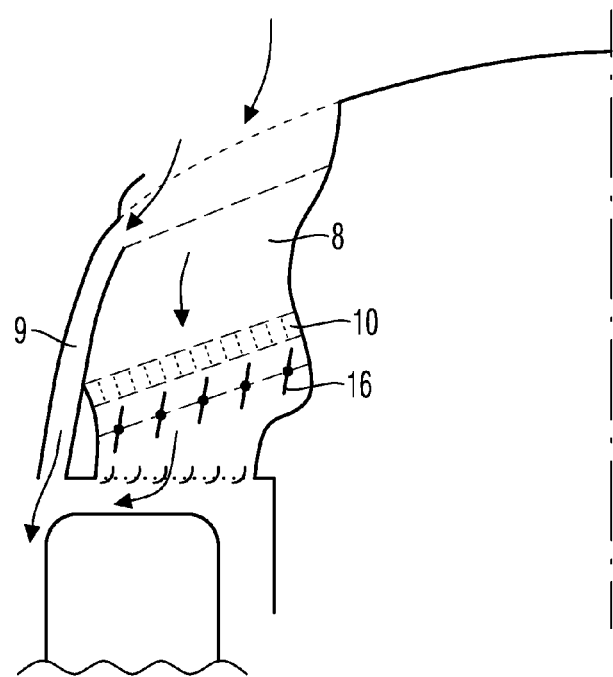
FIG. 7 is a partial and diagrammatic sectional illustration of a third embodiment of the front of a motor vehicle.
Figure 8:
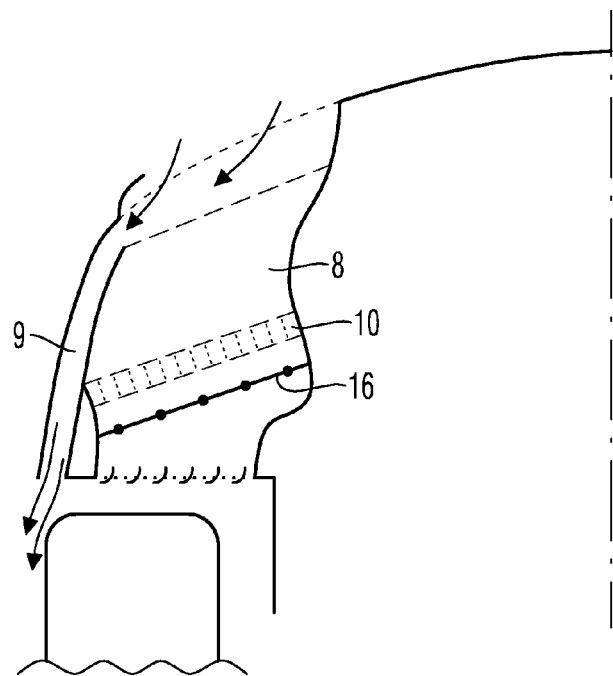
FIG. 8 is a partial and diagrammatic sectional illustration of the embodiment of FIG. 7 in a different operating state.

FIGS. 7 and 8 show a further exemplary embodiment, in which the air flow control element 16 of the first air duct 8 is downstream of the heat exchanger 10.

In FIG. 7, the air flow control element 16 is open. As a result, the maximum air flow can flow through the first air duct 8 and a residual air flow takes place through the second air duct 9.

In FIG. 8, the air flow control element 16 is closed. As a result, the maximum air flow can flow through the second air duct 9. Flow does not pass through the first air duct 8.

Figure 9:
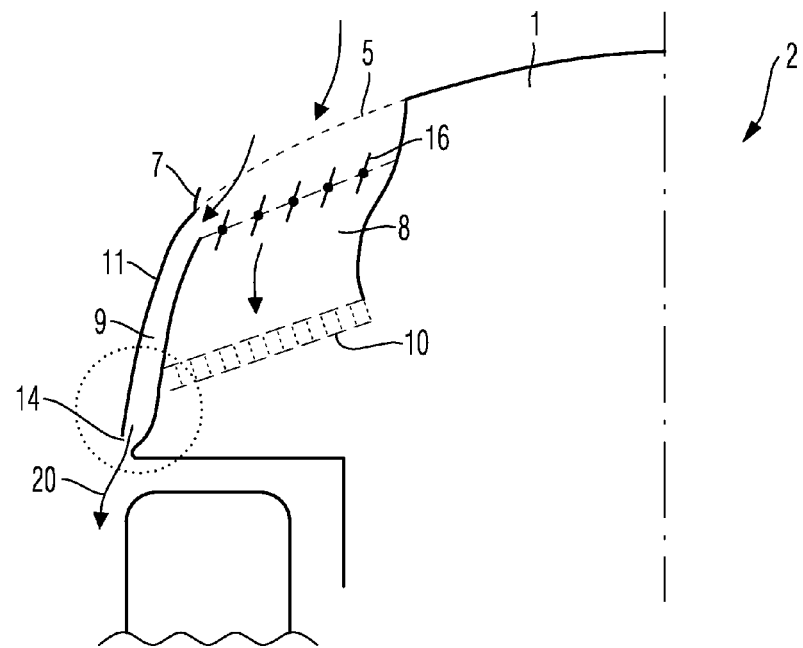
FIG. 9 is a partial and diagrammatic sectional illustration of a fourth embodiment of the front according of a motor vehicle.
Figure 10:
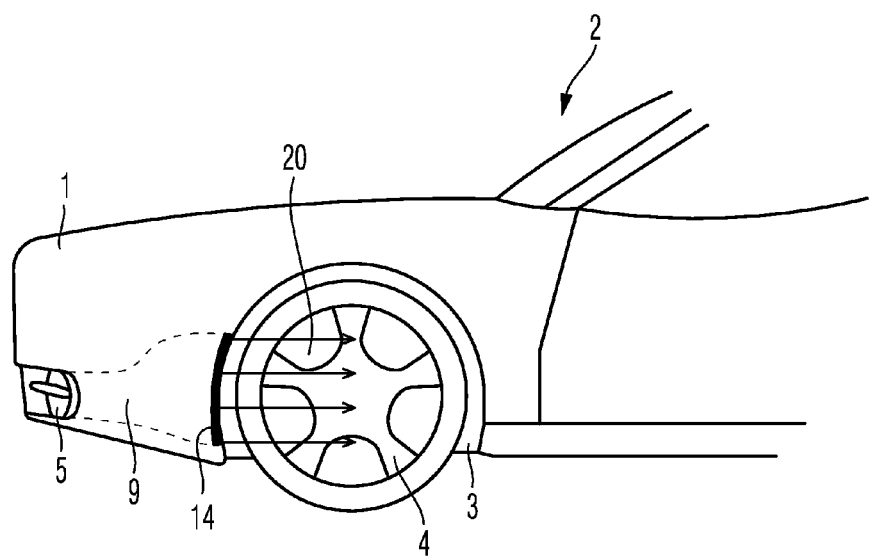
FIG. 10 shows a side view of the front of the motor vehicle of FIG. 9.

FIGS. 9 and 10 show a further exemplary embodiment, in which the second air duct 9 does not open into the wheel arch 3, but rather the air outlet opening is arranged on the vehicle side wall 11 to the side in front of the wheel arch 3.

As a result, the air from the second air duct 9 flows out in front of the wheel arch to the side and generates an air curtain 20 to the side past the wheel arch 3.

The air flow control elements 16, 19 are configured as flaps or as a plurality of flaps which are arranged to be rotated. They can also be opened or closed in some other way, such as displaced laterally or the like.

What is claimed is:

1. A front of a motor vehicle that has a wheel arch, comprising:
   an air inlet opening forward of the wheel arch;
   a first air duct that emanates from the air inlet opening for accommodating a flow of air, the first air duct having a downstream end that opens into the wheel arch;
   a heat exchanger in the first air duct;
   a second air duct that emanates from the air inlet opening at a location substantially adjacent the first air duct, the second air duct having no heat exchanger and guiding an air flow into the wheel arch or to a position of the wheel arch adjacent a laterally outer side of the motor vehicle; and
   an air flow control apparatus at an upstream end of at least one of the first and second air ducts and in proximity to the air inlet opening, the air flow control apparatus controlling air flow through at least one the first and second air ducts.

2. The front of claim 1, wherein the air flow control apparatus is arranged at a transition from the air inlet opening to the first and/or to the second air duct.

3. The front of claim 1, wherein the air flow control apparatus is arranged in the first and in the second air duct.

4. The front of claim 1, wherein the air flow control apparatus is connected upstream of the heat exchanger in an air flow direction.

5. The front of claim 1, wherein the air flow control apparatus is connected downstream of the heat exchanger in the air flow direction.

6. The front of claim 1, wherein the air flow control apparatus has flaps or slats that can be moved, displaced or rotated to control the air flow.

7. The front of claim 1, wherein the air flow control apparatus has control elements that can be controlled jointly or independently of one another and that are arranged in one of the first or second air ducts.

8. The front of claim 1, wherein the air flow control apparatus has control elements that can be controlled jointly or independently of one another and that are arranged in the first and in the second air duct.

9. The front of claim 1, wherein the second air duct opens into the wheel arch.

10. The front of claim 1, wherein the second air duct opens on a side of the vehicle body in front of the wheel arch.

11. The front of claim 1, the air flow control apparatus is disposed to selectively block the flow of air through the first air duct, the air flow control apparatus is sloped relative to a direction of travel of the motor vehicle to guide the flow of air toward the second air duct when the air flow control apparatus is selectively blocking the flow of air through the first air duct.

12. The front of claim 1, wherein the first air duct is delimited by a first wall and a second wall laterally outward on the motor vehicle from the first wall, and the second air duct is delimited by the second wall and an outer side wall of the vehicle.

* * * * *